United States Patent
Blum et al.

(10) Patent No.: US 9,884,606 B2
(45) Date of Patent: Feb. 6, 2018

(54) BELT-RETRACTOR HOUSING SHELL

(71) Applicant: TRW Automotive GmbH, Alfdorf (DE)

(72) Inventors: Herbert Blum, Schwabisch Gmuend (DE); Kai Ulrich Machens, Stuttgart (DE); Jens Scholz, Schorndorf (DE); Jens Neumann, Ebersbach (DE)

(73) Assignee: TRW Automotive GmbH (DE)

( * ) Notice: Subject to any disclaimer, the term of this patent is extended or adjusted under 35 U.S.C. 154(b) by 370 days.

(21) Appl. No.: 14/428,373

(22) PCT Filed: Sep. 17, 2013

(86) PCT No.: PCT/EP2013/002801
§ 371 (c)(1),
(2) Date: Mar. 16, 2015

(87) PCT Pub. No.: WO2014/044383
PCT Pub. Date: Mar. 27, 2014

(65) Prior Publication Data
US 2015/0239428 A1    Aug. 27, 2015

(30) Foreign Application Priority Data

Sep. 19, 2012 (DE) .................. 10 2012 018 477

(51) Int. Cl.
B60R 22/34    (2006.01)
(52) U.S. Cl.
CPC ...... B60R 22/34 (2013.01); *B60R 2022/3402* (2013.01)

(58) Field of Classification Search
CPC .................. B60R 22/34; B60R 2022/3402
See application file for complete search history.

(56) References Cited

U.S. PATENT DOCUMENTS

| 5,209,421 A * | 5/1993 | Fujiwara ................ B60R 22/34 242/379 |
| 6,419,178 B1 * | 7/2002 | Kohlndorfer .......... B60R 22/34 242/379.1 |
| 2002/0079397 A1 | 6/2002 | Snyder |
| 2011/0163194 A1 | 7/2011 | Aranda et al. |

FOREIGN PATENT DOCUMENTS

| DE | 20019468 | 5/2001 |
| DE | 202008016858 | 3/2010 |
| DE | 102008052563 | 5/2010 |
| EP | 1733935 | 12/2006 |

OTHER PUBLICATIONS

Article entitled "Optimum Stiffener Layout for the Reduction of Vibration and Noise of Gearbox Housing", vol. 124. pp. 518-523, Sep. 2002.

* cited by examiner

*Primary Examiner* — Sang Kim
(74) *Attorney, Agent, or Firm* — Tarolli, Sundheim, Covell & Tummino LLP

(57) ABSTRACT

A belt retractor casing shell having a cup-shaped configuration comprises a front wall (14) as well as a circumferential wall (16) extending from the front wall (14), the front wall (14) including an annular zone (44) weakened vis-à-vis the radially inside and/or outside adjacent portion around a center (42).

12 Claims, 2 Drawing Sheets

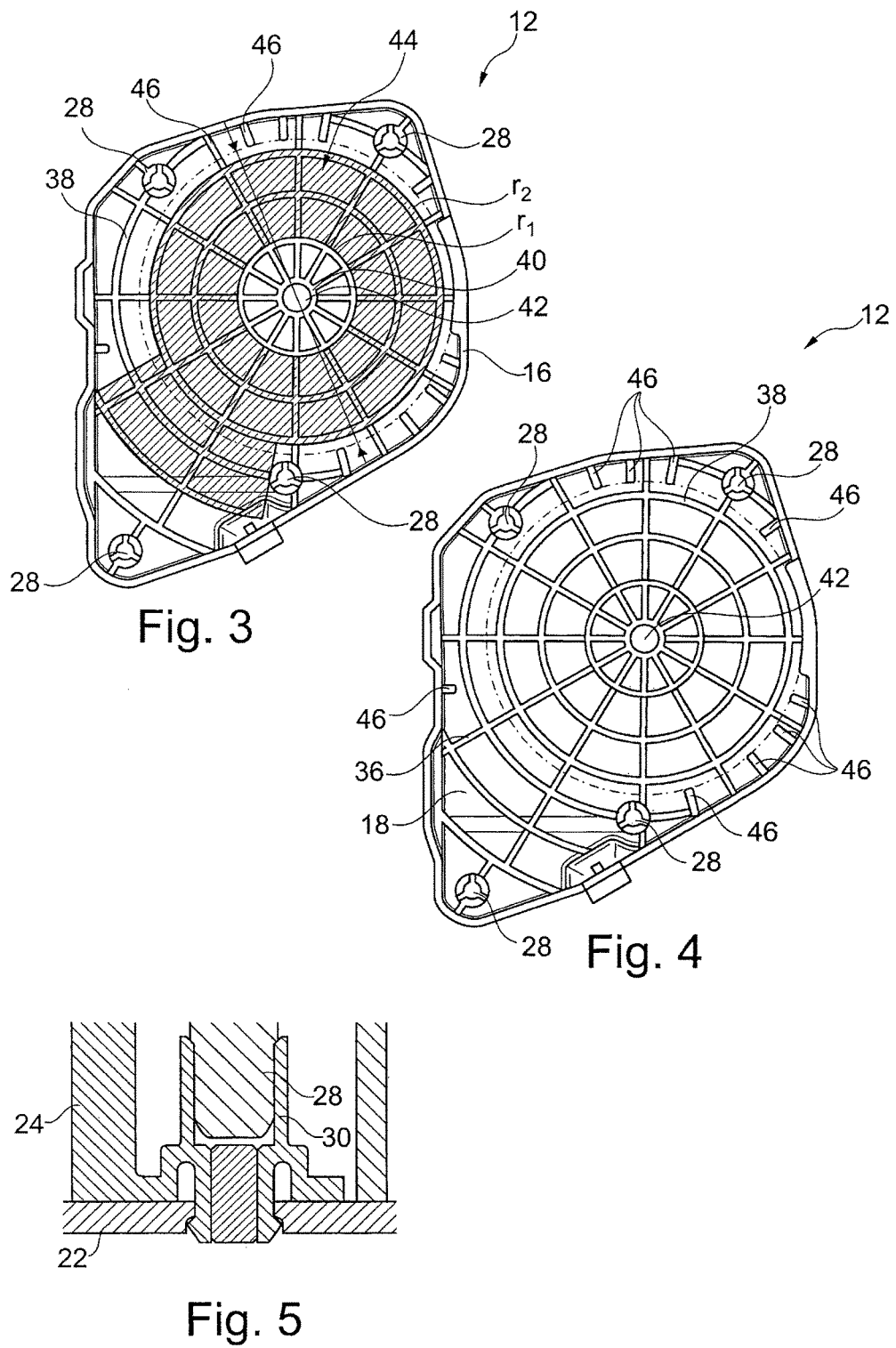

BELT-RETRACTOR HOUSING SHELL

RELATED APPLICATIONS

This application corresponds to PCT/EP2013/002801, filed Sep. 17, 2013, which claims the benefit of German Application No. 10 2012 018 477.8, filed Sep. 19, 2012, the subject matter of which are incorporated herein by reference in their entirety.

BACKGROUND OF THE INVENTION

The invention relates to a belt retractor casing shell.

Casing shells for belt retractors having a cup-shaped configuration comprising a front wall and a circumferential wall extending from the front wall are used for closing off a belt retractor toward the sides and cover the sides of the belt retractor at the hubs of the belt reel. They serve e.g. for preventing dirt from penetrating the mechanism of the be retractor itself.

SUMMARY OF THE INVENTION

It is the object of the invention to reduce the sound emission of the belt retractor by the design of a casing shell.

In accordance with the invention, this is achieved in a belt retractor casing shell having a cup-shaped configuration and comprising a front wall as well as a circumferential wall extending from the front wall, the front wall having around its center an annular zone weakened vis-à-vis the radially inside and/or outside adjacent portion. The weakened zone excels by the fact that it has higher flexibility, lower rigidity at least in portions and/or lower material strength at least in portions vis-à-vis the surrounding portions of the front wall. It has turned out that by these relatively minor changes the vibration behavior of the casing shell can be widely influenced so that the frequency spectrum of the sound emission of the belt retractor can be easily set by specifically providing an annular weakened zone.

Tests have resulted in the fact that a reduction of the sound emission of up to 5 dB can be achieved. Especially it has turned out that the sound radiation in the frequency bands at e.g. 1.6 kHz, 2.0 kHz, 2.5 kHz and 4.0 kHz can be reduced by up to 5 db. This is applicable e.g. in the case of excitation with white noise and in comparison with a belt retractor shell which is identical except for the weakened zone.

In a preferred embodiment of the invention, a reinforcing structure including ribs is provided on the inside of the front wall. This reinforcing structure preferably extends over the entire inside of the front wall up to the circumferential wall.

In an advantageous variant, the reinforcing structure includes cobweb like arranged ribs which may comprise ribs extending radially toward the center and ribs extending concentrically around the center. The reinforcing structure could as well be designed according to a different appropriate geometric pattern, e.g. a honeycomb structure.

Preferably, in the weakened zone the ribs of the reinforcing structure are formed at least in portions to have a reduced cross-section, especially a reduced height. For example, the height of the ribs can be reduced approximately by half. It is also possible to reduce the width of the ribs vis-à-vis the radially inside or outside adjacent zones. The ribs can also be omitted completely or in portions in the weakened zone.

The weakened zone preferably has a width in the radial direction of approx. 1 to 3 cm.

For example, a continuous circumferential circular rib is formed around the geometric center of the front wall at a distance of from approximately 0.5 to about 2 cm.

The annular weakened zone can follow radially outwardly to be directly adjacent to said rib. The weakened zone can reach up to the circumferential wall, but at least in portions a further zone usually configured with reinforcing ribs can extend between the weakened zone and the circumferential wall.

The weakened zone also can extend in portions at least in some sectors radially further outwardly than in other circumferential portions. This is mainly of advantage when the front wall has no circular shape but follows the rather asymmetric shape of the side wall of the belt retractor.

Also in the area of the center at least in portions a further weakened zone may be additionally formed.

On the outer periphery of the front wall preferably in particular positioning ribs protruding radially inwardly from the circumferential wall, extending radially inwardly and ending ahead of the weakened zone are provided the cross-section of which is larger than the cross-section of the ribs of the reinforcing structure outside the weakened zone. The positioning ribs serve, for example, for orientating and, where appropriate, for clamping the casing shell at/to a functional component cover and, resp., at/to the frame of the belt retractor. The positioning ribs can be provided on the circumferential wall along the entire periphery of the front wall or only at particular portions along the periphery.

The belt retractor shell is preferably made of plastic material. With this material, apart from simple manufacture, an especially effective sound absorption is resulting.

Preferably, the inside of the front wall of the belt retractor shell is not adjacent to other components of the belt retractor in the state mounted on the belt retractor. A gap is advantageously formed between the inside of the front wall and, for example, a functional component cover of the belt retractor.

Also the circumferential wall is adjacent to the frame and, resp., to a functional component cover of the belt retractor preferably only in the area of discrete fastening elements as well as optionally by the positioning ribs and the free edge of the circumferential wall.

The weakened zone advantageously has a larger distance from the outside of the functional component cover of the belt retractor configured as a separate part than the portions provided radially inside and/or outside the weakened zone. It has turned out that in this manner no contact is made with the functional component cover even in the case of larger vibration amplitude of the casing shell in the weakened zone and thus no additional sounds can be generated.

BRIEF DESCRIPTION OF THE DRAWINGS

Hereinafter the invention will be described in detail by way of an embodiment with reference to the enclosed drawings, in which:

FIG. 3 is a top view on the belt retractor casing shell from FIG. 2;

FIG. 4 is a further top view on the belt retractor casing shell from FIG. 2; and FIG. 5 shows a schematic sectional view of a snap lock of a fastening pin of the belt retractor casing she from FIG. 1 and a locking portion of the belt retractor.

DESCRIPTION

Figure 1:
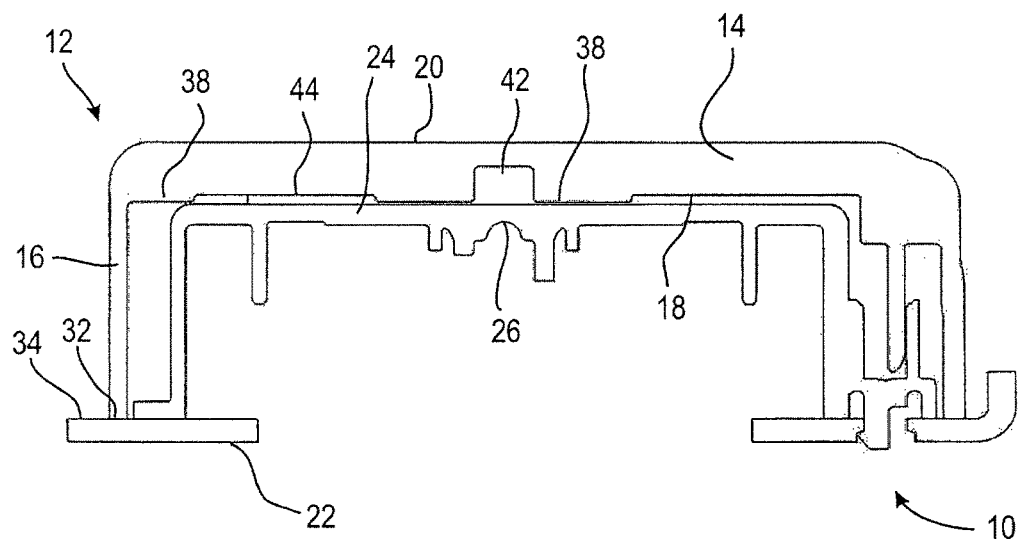
FIG. 1 shows a schematic sectional view across a belt retractor casing shelf according to the invention mounted to a belt retractor according to the invention.
Figure 2:
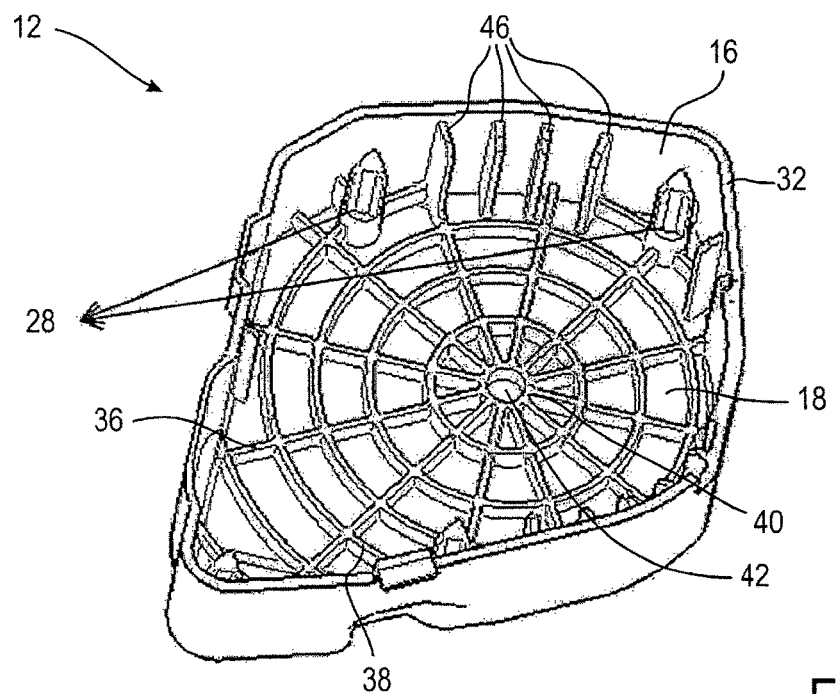
FIG. 2 shows a belt retractor casing shell according to the invention in a schematic perspective view.

FIG. 1 illustrates a belt retractor 10 which is closed off laterally outwardly by a belt retractor casing shell 12.

The casing shell 12 includes a front wall 14 substantially even from outside as well as a circumferential wall 16 which is circumferential around the front wall 14 and protrudes perpendicularly therefrom. The inside 15 of the front wall 14 faces the functional components of the belt retractor 10 in the illustrated state mounted on the belt retractor 10, while the outside 20 of the front wall 14 faces away from the belt retractor 10.

Typically two casing shells 12 are provided which are fastened on both sides of a belt reel (not shown) to a frame 22 of the belt retractor 10.

The casing shells 12 close off the belt retractor 10 laterally outwardly and in the shown example cover all functional components such as the belt reel, an inertia sensor as well as a functional component cover 24 which e.g. covers the inertia sensor and in which a bearing 26 for the belt reel is formed in this case.

The casing shell 12 is connected, via plural fastening pins 28, to appropriate locking members 30 provided e.g. on the functional component cover 24. The fastening pins 28 are designed so that they are engaged in the locking elements 30 via an axial portion extending over several millimeters and in this manner the casing shell 12 is tightly connected to the belt retractor 10. This is illustrated in detail in FIG. 5.

The free edge 32 of the circumferential wall 16 in this example rests peripherally on an outer surface 34 of the frame 22 of the belt retractor 10.

On the inside 18 of the front wall 14 a reinforcing structure is formed which in this example consists of cobweb-like arranged ribs, wherein radially extending ribs 36 and concentrically circularly extending ribs 38 are provided. All circular ribs 38 are equally spaced here, e.g. at approximately 0.5 to 2 cm.

For reasons of clarity only one rib of the respective type of ribs is provided with a reference numeral in the Figures.

In the shown example all radial ribs 36 end at the innermost circular rib 36 which encloses a center 42 of the casing shell 12. The center 42 is located above the bearing 26 of the belt reel in the mounted state (cf. FIG. 1). The distance of the innermost circular rib 38 from the center 42 in this case is about 0.5 cm. Insides the rib 38 the inside 18 of the front wall is formed to be flat.

In the shown embodiment, between the center 42 and the circumferential wall 16 an annular weakened zone 44 is formed between a radius $r_1$ and a radius $r_2$ (shown in hatched lines in FIG. 3). In this example the weakened zone 44 extends directly radially outside of the second circular rib 38 peripheral around the center 42 and reaches over the major part of the surface of the front wall 14 up to and including the fourth circular rib 38 peripheral around the center 42 which forms the last completely circularly closed rib 38 ahead of the circumferential wall 16.

In the lower corner on the left in the Figures the weakened zone 44 extends over a segment-shaped area of about 60° C. beyond the radius $r_2$ over two further circular ribs 38.

Within the weakened zone 44 in this example both the radial ribs 36 and the circular ribs 38 are reduced as to their height, in this case by half vis-à-vis the residual radial and circular ribs 36, 38 having the same height outside the weakened zone 44.

The weakened zone 44 could also be weakened in a different manner, for example by reducing the thickness of the front wall 14 or by reducing the width of the ribs 36 and/or the ribs 38, or in that only the cross-section (height and/or width) of one of the two types of ribs 36, 38 or particular ribs 36, 38 would be reduced in cross-section only in portions. The ribs 36, 38 could as well be completely missing at least in portions.

The height of the ribs 36, 38 is defined by the distance from the surface of the inside 18 of the front wall 14 to the free end of the respective rib 36, 38. The width of the ribs 36, 38 is defined in parallel to the course of the inside 18 of the front wall 14 in the radial direction (circular ribs 38) or circumferential direction (radial ribs 36).

The weakened zone exhibits lower rigidity and higher flexibility than the surrounding portions of the front wall 14, thus influencing the vibration behavior of the casing shell 12 so that interfering frequency bands, especially within the range of 1.6 kHz, 2.0 kHz, 2.5 kHz and 4.0 kHz may be reduced by up to 5 dB when white noise is applied vis-à-vis a casing shell 12 in which all ribs 36, 38 have the same cross-section over the entire inside 18 of the front wall 14.

Moreover, plural positioning ribs 46 are provided which are formed integrally with the circumferential wall 16 and the front wall 14 on the inside 18 of the casing shell 12 and which extend radially inwardly but end ahead of the weakened zone 44. Only in FIG. 4 all positioning ribs 46 are marked by reference numerals. The positioning ribs 46 in this case serve for improving the clamping effect between the circumferential wall 16 of the casing shell 12 and the functional component cover 24 and, resp., the frame 22 of the belt retractor 10 and to fix the circumferential wall 16 as tightly as possible to these components.

The cross-section of the positioning ribs 46, especially their width but also their height, is selected to be larger than that of the radial ribs 38 outside the weakened zone 44. The width can be selected to be 1.2 to 2.5 times as large, whereas the height is considerably higher and reaches up to nearly below the free edge 32 of the circumferential wall 16.

The height of the circumferential wall 16 as well as the height of the ribs 36, 38 at the inside 18 of the front wall 14 is selected so that in the mounted state the inside 18 of the front wall 14 contacts no other component of the belt retractor 10. In this case, a continuous gap exists between the inside 18 of the front wall 14 and the outside of the functional component cover 24.

In the area of the weakened zone 44 the distance above the ribs 36, 38 is fairly larger, for example twice to four times as large as in the residual area of the front wall 14 above the ribs 36, 38. This permits higher vibration amplitude for the front wall 14 in the weakened zone 44 without contacting the functional component cover 24.

The casing she 12 in this example is made of plastic material and is fabricated together with the positioning ribs 46, the ribs 36, 38 and the fastening pins 28 as a one-piece injection molded part.

Apart from the ribs 36, 38 the positioning ribs 48 and the fastening pins 28, the inside 18 of the front wall 14 forms a substantially planar surface. In this case also the outside 20 of the front wall 14 is a substantially planar surface.

The invention claimed is:

1. A belt retractor casing shell which has a cup-shaped configuration and includes a front wall (14) as well as a circumferential wall (16) extending from the front wall (14), the front wall (14) including an annular zone (44) around a center (42), the annular zone (44) being weaker than an adjacent portion of the front wall (14) that is at least one of radially inside and radially outside the annular zone (44),
   wherein a reinforcing structure including ribs (36, 38) is provided at an inside (18) of the front wall.

2. The belt retractor casing shell according to claim 1, wherein the reinforcing structure includes cobweb-like arranged ribs (36, 38).

3. The belt retractor casing shell according to claim 1, wherein in the weakened annular zone (44) the ribs (36, 38) of the reinforcing structure are configured to have a reduced cross-section, at least in portions.

4. The belt retractor casing shell according to claim 1, wherein the center (42) is formed to be free of ribs.

5. The belt retractor casing shell according to claim 1, wherein the weakened annular zone (44) starts directly radially outside a second circular rib (38) peripheral around the center (42).

6. The belt retractor casing shell according to claim 1, wherein on the outer periphery of the front wall (14) radially inwardly extending positioning ribs (46) ending ahead of the weakened annular zone (44) are provided the cross-section of which is larger than the cross-section of the ribs (36, 38) of the reinforcing structure outside the weakened annular zone (44).

7. The belt retractor casing shell according to claim 1, wherein the casing shell (12) is made of plastic material.

8. A belt retractor comprising a belt retractor casing shell according to claim 1, wherein a gap is provided between the inside (18) of the front wall and other components of the belt retractor (10) in the state mounted on the belt retractor (10).

9. The belt retractor according to claim 8, wherein the weakened annular zone (44) is spaced further from an outside of a functional component cover (24) than the adjacent portion of the front wall that is at least one of radially inside and radially outside of the weakened annular zone (44).

10. The belt retractor casing shell according to claim 1, wherein in the weakened annular zone (44) the ribs (36, 38) of the reinforcing structure are configured to have a reduced height, at least in portions.

11. The belt retractor casing shell according to claim 1, wherein at least part of the ribs are concentric about the center.

12. The belt retractor casing shell according to claim 1, wherein at least part of the ribs extend radially outward from the center.

* * * * *